United States Patent
Qin

(10) Patent No.: US 10,796,001 B2
(45) Date of Patent: Oct. 6, 2020

(54) SOFTWARE VERIFICATION METHOD AND APPARATUS

(71) Applicant: HUAWEI TECHNOLOGIES CO., LTD., Shenzhen, Guangdong (CN)

(72) Inventor: Yujin Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 15/642,981

(22) Filed: Jul. 6, 2017

(65) Prior Publication Data
US 2017/0300696 A1    Oct. 19, 2017

Related U.S. Application Data

(63) Continuation of application No. PCT/CN2015/070300, filed on Jan. 7, 2015.

(51) Int. Cl.
  *G06F 21/00* (2013.01)
  *G06F 21/57* (2013.01)
  *G06F 21/64* (2013.01)
  *G06F 8/61* (2018.01)

(52) U.S. Cl.
  CPC .............. *G06F 21/57* (2013.01); *G06F 21/64* (2013.01); *G06F 8/61* (2013.01); *G06F 2221/033* (2013.01)

(58) Field of Classification Search
  CPC .... G06F 21/57; G06F 21/64; G06F 2221/033; G06F 8/61
  USPC .......................................................... 726/22
  See application file for complete search history.

(56) References Cited

U.S. PATENT DOCUMENTS

| | | | |
|---|---|---|---|
| 2002/0091644 A1* | 7/2002 | Wong | G06F 21/10 705/59 |
| 2006/0212554 A1* | 9/2006 | Shouno | H04L 29/12528 709/221 |
| 2008/0127167 A1* | 5/2008 | Elliott | G06F 8/61 717/174 |
| 2011/0010701 A1 | 1/2011 | Cooper et al. | |
| 2014/0032915 A1* | 1/2014 | Muzammil | H04L 9/3236 713/176 |

(Continued)

FOREIGN PATENT DOCUMENTS

| | | |
|---|---|---|
| CN | 102609665 A | 7/2012 |
| CN | 102880828 A | 1/2013 |

(Continued)

OTHER PUBLICATIONS

Office Action, dated Nov. 27, 2018, in Chinese Application No. 201580002499.2 (10 pp.).

(Continued)

*Primary Examiner* — Khoi V Le
*Assistant Examiner* — Kevin Ayala
(74) *Attorney, Agent, or Firm* — Fish & Richardson P.C.

(57) ABSTRACT

A software verification method and apparatus are disclosed, applied to the cloud computing field and the communications field, and can be used to automatically verify whether an installation file of VNF software has been tampered with. The method includes: obtaining installation files of VNF software and signature files of the installation files, where the signature files of the installation files are used to store verification information of the installation files; verifying the installation files according to the signature files of the installation files; and determining, if the verification of the installation files succeeds, that the VNF software has not been tampered with.

9 Claims, 8 Drawing Sheets

(56) References Cited

U.S. PATENT DOCUMENTS

| | | | | |
|---|---|---|---|---|
| 2014/0122329 A1* | 5/2014 | Naggar | ............. | G06Q 20/3552 705/41 |
| 2016/0335111 A1* | 11/2016 | Bruun | ................ | G06F 9/45558 |

FOREIGN PATENT DOCUMENTS

| | | | |
|---|---|---|---|
| CN | 102982258 A | 3/2013 |
| CN | 103036894 A | 4/2013 |
| CN | 103354496 A | 10/2013 |
| CN | 104049973 A | 9/2014 |
| CN | 104123481 A | 10/2014 |
| CN | 104156638 A | 11/2014 |
| CN | 104253866 A | 12/2014 |
| WO | 2014/206171 A1 | 12/2014 |

OTHER PUBLICATIONS

Cappos et al., "A Look in the Mirror: Attacks on Package Managers", Department of Computer Science, University of Arizona, Tucson, USA, Oct. 27, 2008, XP058344945, 10 pp.

Yangdage518, Angeeks-S.G.A Series, Section 19, "Modifying a DEX File to Add Out-of-Bounds Effects to the Official ROM", bbs.angeeks.com, Apr. 14, 2012, 17 pp.

Zengyangtech, "Feasibility Analysis on Modifying the APK File on Android", http://blog.csdn.net/zengyangtech/article/details/5735071, Jul. 14, 2010, 11 pp.

Ruoxiaogu, "Inotia 3, Replacing the Main Game Program on iOS", Pocket Bus Forum, Feb. 27, 2012, 3 pp.

Extended European Search Report dated Nov. 15, 2017 in corresponding European Patent Application No. 15876464.7, 8 pp.

International Search Report dated Sep. 24, 2015 in corresponding International Patent Application No. PCT/CN2015/070300, 8 pp.

Written Opinion of the International Search Authority dated Sep. 24, 2015 in corresponding International Patent Application No. PCT/CN2015/070300, 4 pp.

International Search Report dated Sep. 24, 2015 in corresponding International Application PCT/CN2015/070300.

\* cited by examiner

SOFTWARE VERIFICATION METHOD AND APPARATUS

CROSS-REFERENCE TO RELATED APPLICATIONS

This application is a continuation of International Application No. PCT/CN2015/070300, filed on Jan. 7, 2015, the disclosure of which is hereby incorporated by reference in its entirety.

TECHNICAL FIELD

The present invention relates to the cloud computing field and the communications field, and in particular, to a software verification method and apparatus.

BACKGROUND

With the rise of network virtualization, conventional physical network elements are gradually replaced by virtualized network elements in a cloud environment. Because software and hardware of a network element on a virtualized network are decoupled, the software no longer depends on special hardware, and all software can run in any virtual environment. As a result, a risk of software being tampered with becomes increasingly great. Besides, because the network elements in the cloud environment are isolated merely by means of software, the software is also more easily to be maliciously attacked.

An existing verification method mainly uses a Hash verification method of the conventional physical network elements as a reference. Specifically, an operation and maintenance person may verify an installation package by using a Hash verification tool. The Hash verification tool obtains through calculation a verification value of the installation package by using a Hash algorithm, and compares the verification value with a preset standard verification value. If the verification value and the preset standard verification value are the same, it is considered that the installation package has not been tampered with, and if the verification value and the preset standard verification value are different, it is considered that the installation package has been tampered with. However, the method has the following problems:

1) Because manual verification has personal factors, and has a relatively high requirement on personal skills, there is a security risk in personnel quality in this method.

2) This method can only ensure that an installation package before installation has not been tampered with, but cannot ensure that each file inside the package has not been tampered with.

SUMMARY

Embodiments of the present invention provide a software verification method and apparatus, so as to automatically verify whether an installation file of VNF software has been tampered with.

To achieve the foregoing objective, the following technical solutions are used in the embodiments of the present invention.

According to a first aspect, a software verification method is provided, including:

obtaining installation files of virtual network function VNF software and signature files of the installation files, where the signature files of the installation files are used to store verification information of the installation files;

verifying the installation files according to the signature files of the installation files; and determining, if the verification of the installation files succeeds, that the VNF software has not been tampered with.

With reference to the first aspect, in a first possible implementation manner, the verifying the installation files according to the signature files of the installation files includes:

verifying the installation files according to the signature files of the installation files if it is determined that none of the installation files are modified according to a preset rule.

With reference to the first aspect, in a second possible implementation manner, the verifying the installation files according to the signature files of the installation files includes:

performing, if it is determined that at least one installation file in the installation files is already modified according to the preset rule, integrity protection verification on the at least one installation file, and respectively verifying corresponding installation files according to signature files of other installation files different from the at least one installation file.

With reference to the second possible implementation manner, in a third possible implementation manner, the method further includes:

monitoring whether the installation files are modified according to the preset rule; and performing, if at least one installation file is modified according to the preset rule, integrity protection on the at least one installation file.

With reference to any one of the first aspect, or the first to the third possible implementation manners, in a fourth possible implementation manner, the obtaining installation files and signature files of the installation files includes:

obtaining an installation package of the VNF software and a signature file of the installation package, where the installation package includes the installation files and the signature files of the installation files, and the signature file of the installation package is used to store verification information of the installation package;

verifying the installation package according to the signature file of the installation package; and obtaining the installation files and the signature files of the installation files if the verification of the installation package succeeds.

With reference to the fourth possible implementation manner, in a fifth possible implementation manner, before the obtaining an installation package of the VNF software and a signature file of the installation package, the method further includes:

signing the installation files, to obtain the signature files of the installation files; and signing the installation package, to obtain the signature file of the installation package, where the installation package includes the installation files and the signature files of the installation files.

According to a second aspect, a software verification apparatus is provided, including:

an obtaining unit, configured to obtain installation files of VNF software and signature files of the installation files, where the signature files of the installation files are used to store verification information of the installation files;

a verification unit, configured to verify the installation files according to the signature files of the installation files; and a determining unit, configured to determine, when the verification of the installation files succeeds, that the VNF software has not been tampered with.

With reference to the second aspect, in a first possible implementation manner, the verification unit is specifically configured to:

verify the installation files according to the signature files of the installation files if it is determined that none of the installation files are modified according to a preset rule.

With reference to the second aspect, in a second possible implementation manner, the verification unit is specifically configured to:

perform, if it is determined that at least one installation file in the installation files is already modified according to the preset rule, integrity protection verification on the at least one installation file, and respectively verify corresponding installation files according to signature files of other installation files different from the at least one installation file.

With reference to the second possible implementation manner, in a third possible implementation manner, the apparatus further includes:

a monitoring unit, configured to monitor whether the installation files are modified according to the preset rule; and an integrity protection unit, configured to perform, if at least one installation file is modified according to the preset rule, integrity protection on the at least one installation file.

With reference to any one of the second aspect, or the first to the third possible implementation manners, in a fourth possible implementation manner, the obtaining unit is specifically configured to:

obtain an installation package of the VNF software and a signature file of the installation package, where the installation package includes the installation files and the signature files of the installation files, and the signature file of the installation package is used to store verification information of the installation package;

verify the installation package according to the signature file of the installation package; and obtain the installation files and the signature files of the installation files if the verification of the installation package succeeds.

According to a third aspect, a software verification apparatus is provided, including: a first processor and a first memory, where the first memory is configured to store program code executed by the first processor; and the first processor is configured to: obtain installation files of VNF software and signature files of the installation files, where the signature files of the installation files are used to store verification information of the installation files; and verify the installation files according to the signature files of the installation files; and determine, when the verification of the installation files succeeds, that the VNF software has not been tampered with.

With reference to the third aspect, in a first possible implementation manner, the first processor is specifically configured to:

verify the installation files according to the signature files of the installation files if it is determined that none of the installation files are modified according to a preset rule.

With reference to the third aspect, in a second possible implementation manner, the apparatus further includes: a second processor and a second memory, where the second memory is configured to store program code executed by the second processor;

the second processor is configured to perform, if it is determined that at least one installation file in the installation files is already modified according to the preset rule, integrity protection verification on the at least one installation file; and the first processor is further configured to respectively verify corresponding installation files according to signature files of other installation files different from the at least one installation file.

With reference to the second possible implementation manner, in a third possible implementation manner, the first processor is further configured to: monitor whether the installation files are modified according to the preset rule, and notify the second processor when at least one installation file is modified according to the preset rule; and the second processor is further configured to perform, if at least one installation file is modified according to the preset rule, integrity protection on the at least one installation file.

With reference to any one of the third aspect, or the first to the third possible implementation manners, in a fourth possible implementation manner, the first processor is specifically configured to:

obtain an installation package of the VNF software and a signature file of the installation package, where the installation package includes the installation files and the signature files of the installation files, and the signature file of the installation package is used to store verification information of the installation package;

verify the installation package according to the signature file of the installation package; and obtain the installation files and the signature files of the installation files if the verification of the installation package succeeds.

Embodiments of the present invention provide a software verification method and apparatus, which can be used to verify an installation file to ensure that the installation file has not been tampered with. In this way, by means of the method provided in the embodiments of the present invention, whether an installation file has been tampered with can be automatically determined, thereby ensuring that VNF software installed according to the installation file has not been tampered with.

BRIEF DESCRIPTION OF DRAWINGS

To describe the technical solutions in the embodiments of the present invention or in the prior art more clearly, the following briefly describes the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
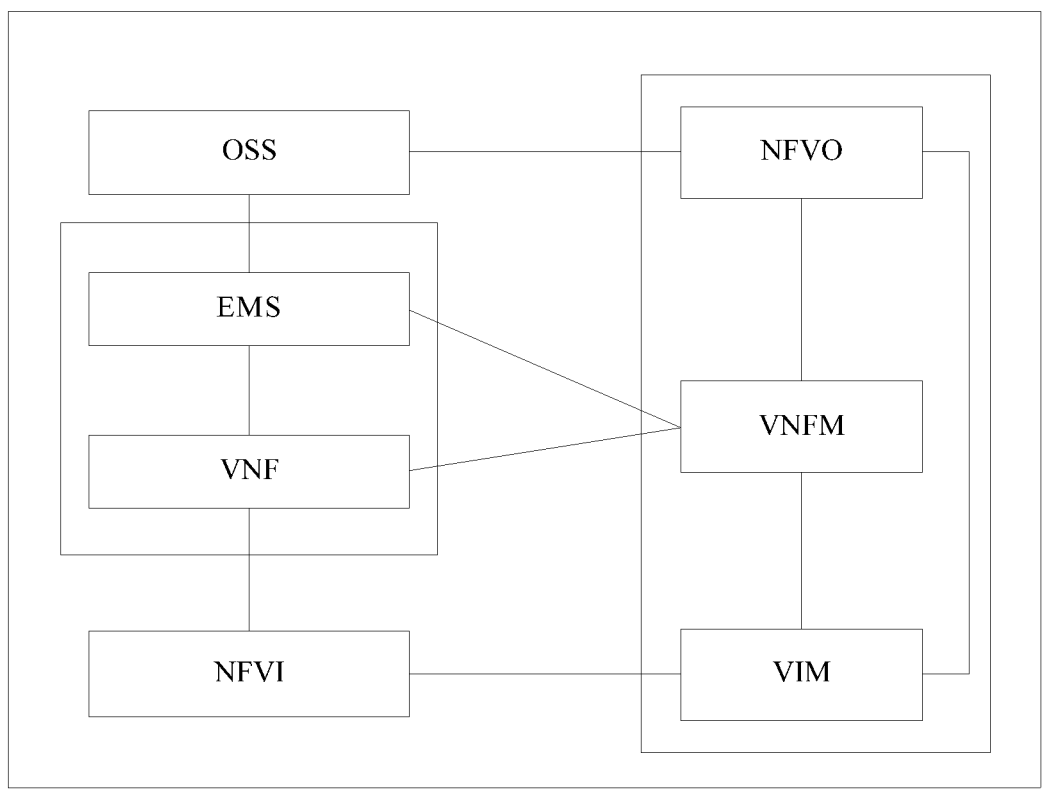
FIG. 1 is a schematic diagram of a logical function architecture of an existing virtualized communications network based on a cloud system.

As shown in FIG. 1, FIG. 1 is a schematic diagram of a logical function architecture of an existing virtualized communications network based on a cloud system. The virtualized communications network includes an OSS (Operation Support System) node, an EMS (Element Management System) node, a VNF (Virtual Network Function) node, an NFVO (Network function virtualization Orchestrator) node, a VNFM (Virtual Network Function Manager) node, a VIM (Virtualized Infrastructure Manager) node, and an NFVI (Network Function Virtual Infrastructure) node. The operation support system is separately connected to the element management system and the network functions virtualization orchestrator. The element management system is separately connected to the virtual network function and the virtual network function manager. The virtual network function is separately connected to the network functions virtualization infrastructure and the virtual network function manager. The network functions virtualization orchestrator is connected to the virtual network function manager. The virtual network function manager is connected to the virtualized infrastructure manager. The virtualized infrastructure manager is connected to the network functions virtualization infrastructure.

In should be noted that, the NFVO node, the VNFM node, and the VIM node are included in NFV-MANO (Network Function Virtualisation Management and Orchestrator). The virtualized communications network may include at least one EMS and at least one VNF. Each VNF may have a different function, and a function of an EMS and a function of a VNF may also be integrated for implementation in one physical device. The NFVI node in an underlying support architecture includes a computing resource, a storage resource, and a transmission resource.

The cloud system mainly includes cloud computing and cloud storage. Cloud computing refers to distributed computing, where a server cluster is set by using data centers in places, and different applications are provided for a user by using a network. Cloud storage is storing user data on a cloud, to avoid using a local resource for storage, thereby achieving an objective of off-site use and off-site storage.

The OSS is a system supporting operator integration and information resource sharing, and mainly includes network management, system management, billing, operation, accounting, customer service, and the like. The EMS is a system managing one or more network elements. The VNF may be used to implement a function of a physical entity device on a communications network in the cloud system. That is, the VNF is a virtualized network element. For example, the VNF may implement a function of a network element such as a mobility management entity or a base station. The NFVO is used to deploy the VNF, the VNFM is used to manage the VNF, and the VIM is used to manage the NFVI.

For example, assuming that it is needed for the VNF to implement a function of a base station, an operator may configure a base station function of the VNF by using the OSS, send configuration information to the VNF by means of an interface between the OSS and the EMS and an interface between the EMS and the VNF, and then deploy the VNF by using the NFVO, thereby implementing cell coverage of the virtual communications network, and enabling a user to make a call. The operator may further manage the VNF by using the VNFM. The VNF may have a function of a mobility management entity.

Embodiment 1

Figure 2:
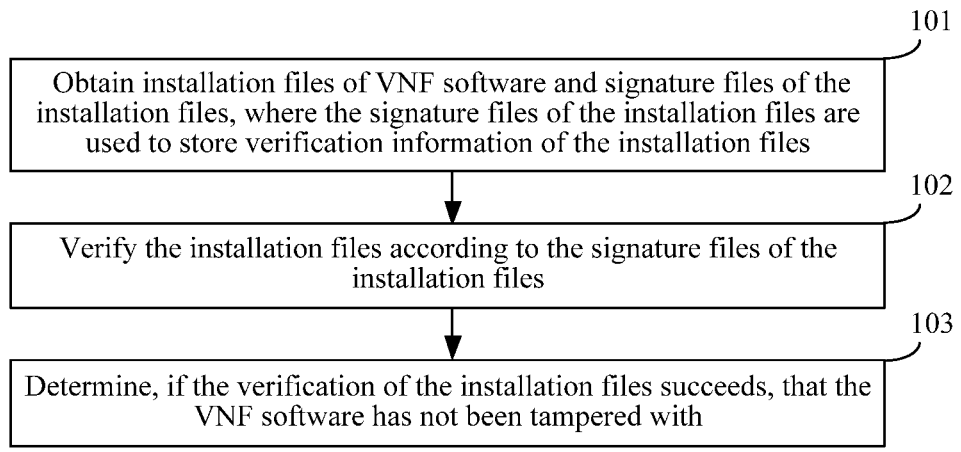
FIG. 2 is a flowchart of a software verification method according to an embodiment of the present invention.

This embodiment of the present invention provides a software verification method, as shown in FIG. 2, which is applied to a software verification apparatus. The software verification apparatus may be a server, for example, one or more computers, or may be a single apparatus. The method may include the following steps.

Step 101. Obtain installation files of VNF software and signature files of the installation files, where the signature files of the installation files are used to store verification information of the installation files.

The verification information is generated in a signing process, and is released together with a signed file, for use during tamper-preventing verification. The installation files may include files for installing the VNF software such as an executable program, a configuration file, a template, and a script.

Step 102. Verify the installation files according to the signature files of the installation files.

The verification in step 102 corresponds to the signing. During the signing, when sending a packet, a sender generates a packet digest from a packet text by using a Hash function, and then encrypts the digest by using a private key of the sender, and the encrypted digest is sent, as a digital signature of the packet, to a receiver together with the packet. Correspondingly, during the verification, the receiver first obtains, through calculation, the packet digest from the received original packet by using a Hash function that is the same as that used by the sender, and then decrypts, by using a public key of the sender, the digital signature added to the packet. If the two digests are the same, the receiver can confirm that the digital signature belongs to the sender.

Step 103. Determine, if the verification of the installation files succeeds, that the VNF software has not been tampered with.

In this way, by means of the method provided in this embodiment of the present invention, whether an installation file has been tampered with can be automatically determined according to a verification file, thereby ensuring that VNF software installed according to the installation file has not been tampered with.

Further, step 102 may specifically include: verifying the installation files according to the signature files of the installation files if it is determined that none of the installation files are modified according to a preset rule. In this embodiment, installation file content modified by a configuration module in the apparatus is modified according to the preset rule. For example, the configuration module modifies an IP address in a configuration file from being blank to a current address.

Further, step 102 may also specifically include: performing, if it is determined that at least one installation file in the installation files is already modified according to the preset rule, integrity protection verification on the at least one installation file, and respectively verifying corresponding installation files according to signature files of other installation files different from the at least one installation file.

Further, the method further includes: monitoring whether the installation files are modified according to the preset rule; and performing, if at least one installation file is modified according to the preset rule, integrity protection on the at least one installation file. The preset rule may refer to that the configuration module in the software verification apparatus may modify an installation file. For example, the configuration modifies the IP address in the configuration file from being blank to the current IP address.

Further, step 101 may specifically include: obtaining an installation package of the VNF software and a signature file of the installation package, where the installation package includes the installation files and the signature files of the installation files, and the signature file of the installation package is used to store verification information of the installation package; verifying the installation package according to the signature file of the installation package; and obtaining the installation files and the signature files of the installation files if the verification of the installation package succeeds.

Further, before the obtaining an installation package of the VNF software and a signature file of the installation package, the method further includes: signing the installation files, to obtain the signature files of the installation files; and signing the installation package, to obtain the signature file of the installation package, where the installation package includes the installation files and the signature files of the installation files.

It should be noted that, if the verification of the installation packages fails, an alarm is generated. If verification of any installation file fails, installation of the VNF software is stopped. If the VNF software has been tampered with, operation of the VNF software is stopped or instantiation of the VNF software is stopped, and if the installation package has been tampered with, online of the VNF software is stopped.

Further, the method further includes: generating an alarm if the verification of the installation package or any installation file fails, and writing information indicating that the security verification fails into a corresponding log.

Figure 3:
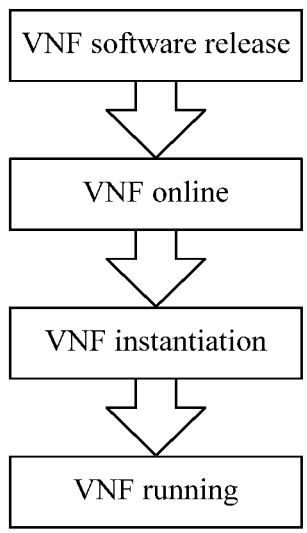
FIG. 3 is a schematic diagram of a life cycle of a VNF.

A life cycle of the VNF may be divided into four stages, as shown in FIG. 3, which includes: a VNF software release stage, a VNF online stage, a VNF instantiation stage, and a VNF running stage. The foregoing software verification method may be applied to different stages of the life cycle of the VNF.

Optionally, steps 101 to 103 may be performed in the VNF instantiation stage or the VNF running stage.

Optionally, in the VNF running stage, when the VNF software is restarted or started, the apparatus may specifically perform the following content: verifying the installation files according to the signature files of the installation files if it is determined that none of the installation files are modified according to a preset rule; or performing, if it is determined that at least one installation file in the installation files is modified according to the preset rule, integrity protection verification on the at least one installation file, and respectively verifying corresponding installation files according to signature files of other installation files different from the at least one installation file.

Optionally, in the VNF instantiation stage, the apparatus may further perform the following content: monitoring whether the installation files are modified according to the preset rule; and performing, if at least one installation file is modified according to the preset rule, integrity protection on the at least one installation file.

Optionally, in the VNF online stage, the apparatus may perform the content specifically included in step 101 in this embodiment.

Optionally, in the VNF software release stage, the apparatus may perform the content before step 101 in this embodiment.

Embodiment 2

This embodiment of the present invention provides another software verification method, applied to a virtual communications network. A life cycle of VNF may be divided into four stages, including: a VNF software release stage, a VNF online stage, a VNF instantiation stage, and a VNF running stage.

Figure 4:
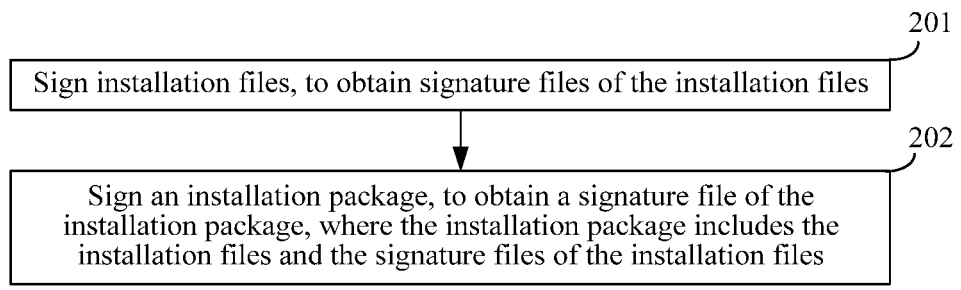
FIG. 4 is a flowchart of another software verification method according to an embodiment of the present invention.

In the VNF software release stage, as shown in FIG. 4, the method includes the following steps.

Step 201. Sign installation files, to obtain signature files of the installation files.

Specifically, digital signing has two functions. First, by means of digital signing, it can be determined that a message is indeed signed and sent by a sender, because others cannot counterfeit a signature of the sender. Second, by means of digital signing, integrity of the message can be determined. Because a feature of a digital signature is that the digital signature represents characteristics of a file, if the file is changed, a value of a digital digest is also changed. Different digital digests are obtained for different files. A process of digital signing uses a Hash function, a public key of the sender, and a private key of the sender.

Step 202. Sign an installation package, to obtain a signature file of the installation package, where the installation package includes the installation files and the signature files of the installation files.

A method of signing the installation package is the same as the signing method in step 201.

Figure 5:
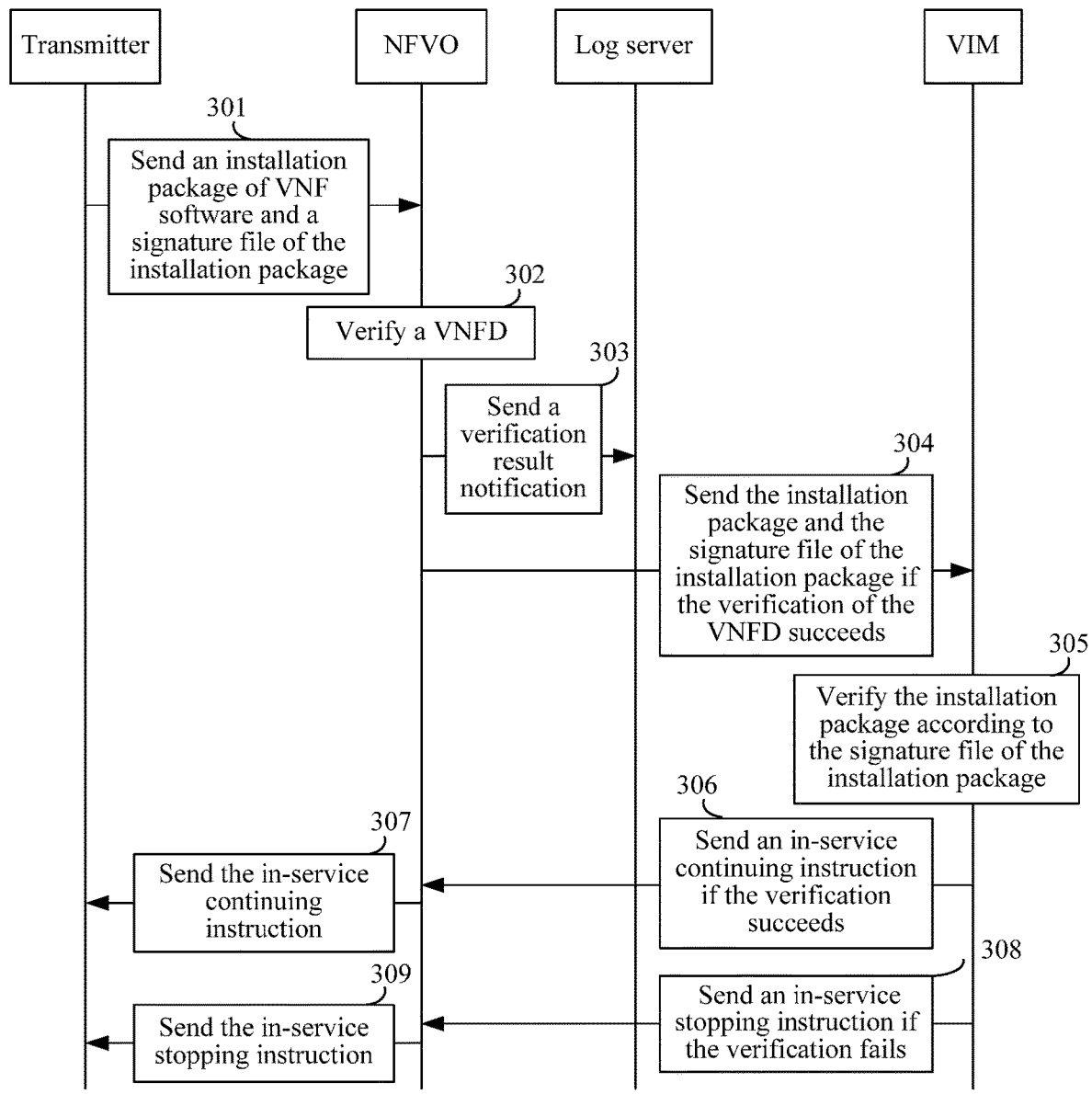
FIG. 5 is a flowchart of another software verification method according to an embodiment of the present invention.

In the VNF online stage, as shown in FIG. 5, the method includes the following steps.

Step 301. A transmitter sends an installation package of VNF software and a signature file of the installation package to an NFVO.

The installation package and the signature file of the installation package may be a compressed file.

In this embodiment, the signature file of the installation package is a file obtained by signing the installation package and used to store related information in the signing process. The installation package may include the signature file.

Step 302. The NFVO verifies a VNFD (virtualized network function descriptor).

The NFVO verifies correctness of the VNFD. The VNFD defines a software function and a needed hardware resource for use during instantiation. During the instantiation, the NFVO needs to verify whether a parameter defined by the VNFD is correct, for example, whether all mandatory parameters are provided, or whether values of the mandatory parameters exceed a maximum value or a minimum value.

Step 303. The NFVO sends a verification result notification to a log server.

Step 304. The NFVO sends the installation package and the signature file of the installation package to a VIM if the verification of the VNFD succeeds.

Step 305. The VIM verifies the installation package according to the signature file of the installation package.

The verification corresponds to the signing, and signed byte set data is verified by using a specified public key and a signing result text. If the verification succeeds, it indicates that the byte set data is certainly authenticated by an owner of the public key (that is, a signer), and has never been tampered with after being signed. If the verification succeeds, true is returned; otherwise, false is returned. The signing result text and/or the public key are/is included in the signature file, and the signed byte set data refers to the installation package.

Step 306. The VIM sends an online continuing instruction to the NFVO if the verification succeeds.

Step 307. The NFVO sends the online continuing instruction to the transmitter.

Step 308. The VIM sends an online stopping instruction to the NFVO if the verification fails.

Step 309. The NFVO sends the online continuing instruction to the transmitter.

In this way, the installation package of the VNF software is no longer received.

It should be noted that, after the verification succeeds, the VIM may decompress the compressed package. The VIM stores the decompressed installation package and the signature file of the installation package for sorted storage.

Figure 6A:
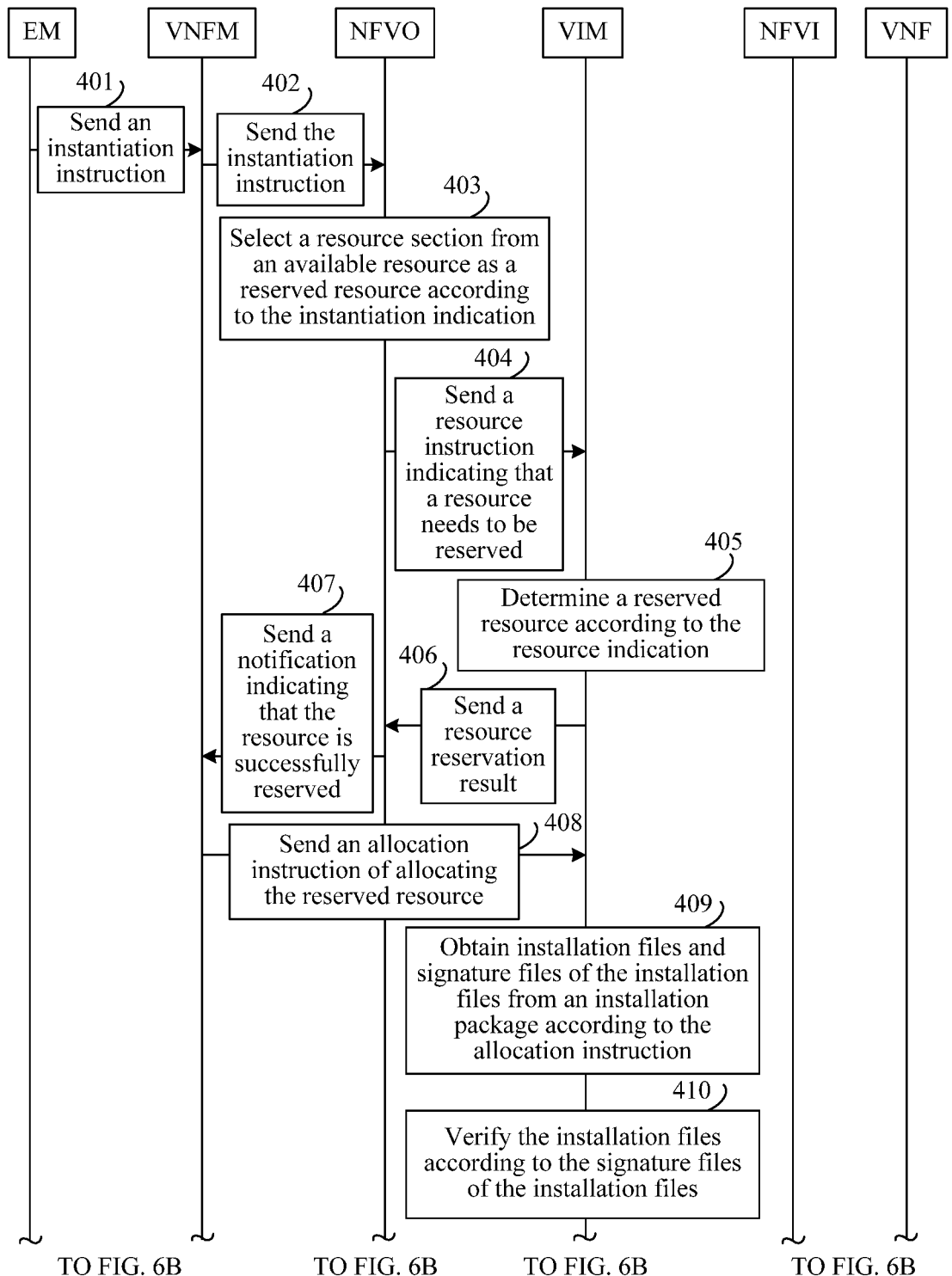
FIG. 6A, FIG. 6B, and FIG. 6C is a flowchart of still another software verification method according to an embodiment of the present invention.
Figure 6B:
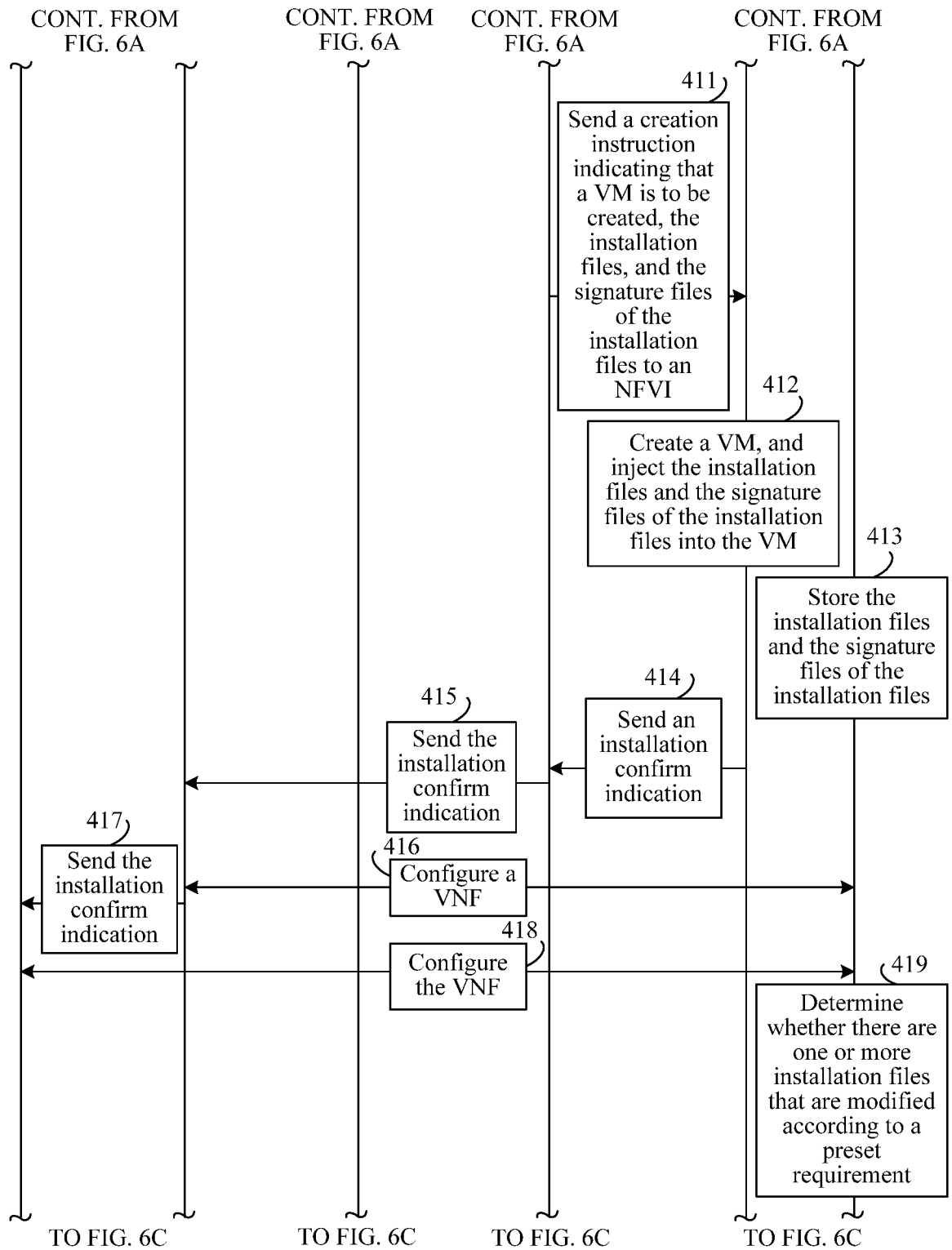
Figure 6C:
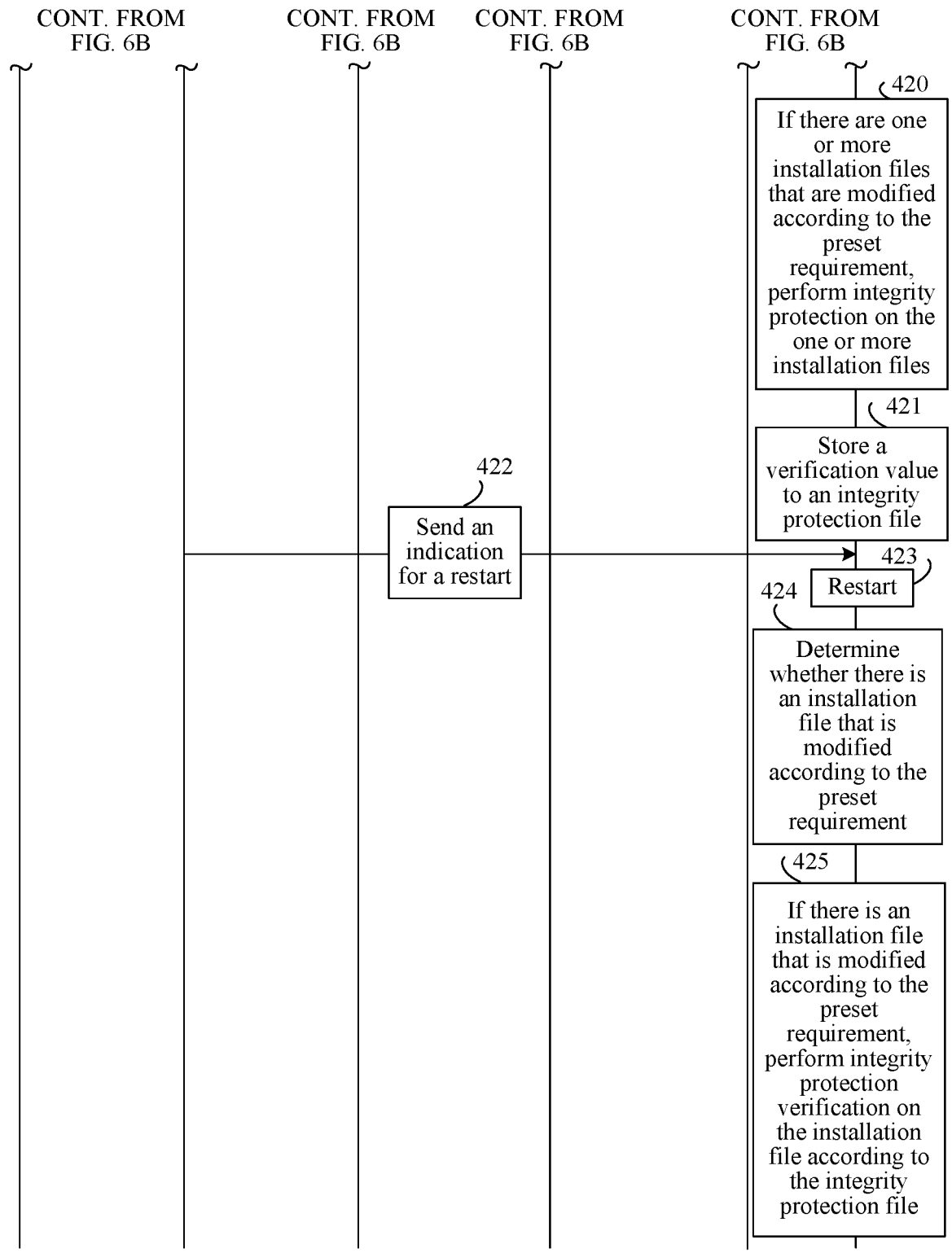

After VNF software is online and an installation package is uploaded, in the VNF instantiation stage, as shown in FIG. 6A, FIG. 6B, and FIG. 6C, the method includes the following steps.

Step 401. An EMS sends an instantiation instruction to a VNFM.

Step 402. The VNFM sends the instantiation instruction to an NFVO.

Step 403. The NFVO selects a resource section from an available resource as a reserved resource according to the instantiation instruction.

The resource section is reserved for verifying installation files in an installation package.

Step 404. The NFVO sends, to a VIM, a resource instruction indicating that a resource needs to be reserved.

Step 405. The VIM determines a reserved resource according to the resource instruction.

Step 406. The VIM sends a resource reservation result to the NFVO.

Step 407. The NFVO sends, to the VNFM, a notification indicating that the resource is successfully reserved.

Step 408. The VNFM sends, to the VIM, an allocation instruction of allocating the reserved resource.

Step 409. The VIM obtains installation files and signature files of the installation files from an installation package according to the allocation instruction.

When the installation package is a compressed package, a method of obtaining the installation files and the signature files of the installation files by the VIM may include: decompressing the installation package in a single time, and each time verification is needed, directly obtaining the installation files and the signature files of the installation files. In addition, the installation files that need to be verified and the signature files of the installation files may also be directly obtained from the compressed package. The first method is used as an example in this embodiment.

Step 410. The VIM verifies the installation files according to the signature files of the installation files.

The verification method in this embodiment is the same as the method in step 205.

Step 411. The VIM sends a creation instruction indicating that a VM (virtual machine) is to be created, the installation files, and the signature files of the installation files to an NFVI.

A physical server is virtualized into multiple virtual machines, and each foregoing VNF operates on a VM.

Step 412. The NFVI creates a VM, and injects the installation files and the signature files of the installation files into the VM.

The two processes of creating the VM and injecting the installation files and the signature files of the installation files into the VM are specific processes of installing VNF software by the NFVI.

Step 413. A VNF stores the installation files and the signature files of the installation files.

Step 414. The NFVI sends an installation confirm instruction to the VIM.

Step 415. The VIM sends the installation confirm instruction to the VNFM.

Step 416. The VNFM configures the VNF.

Step 417. The VNFM sends the installation confirm instruction to the EMS.

Step 418. The EMS configures the VNF.

Step 419. The VNF determines whether there are one or more installation files that are modified according to a preset requirement.

For example, when installation of the VNF is completed, much information that is blank before is filled. For example, an IP address is changed from being blank to a current address.

Step 420. If there are one or more installation files that are modified according to the preset requirement, the VNF performs integrity protection on the one or more installation files.

For example, the VNF may generate a verification value according to a Hash algorithm, and store the verification value.

Step 421. The VNF stores a verification value to an integrity protection file.

Further, the signature files of the installation files may be deleted.

In the VNF running stage, verification needs to be performed again when the VNF software is restarted or started. When no installation file is modified, a signature verification step performed is the same as the verification in the VNF instantiation stage, and is not described in detail herein. Therefore, using restart as an example, as shown in FIG. 6A, FIG. 6B, and FIG. 6C, the method further includes:

Step 422. The VNFM sends an instruction for a restart to the VNF.

Step 423. The VNF is restarted.

Step 424. The VNF determines whether there is an installation file that is modified according to the preset requirement.

Step 425. If there is an installation file that is modified according to the preset requirement, the VNF performs integrity protection verification on the installation file according to the integrity protection file.

Specifically, a new verification value may be calculated for the installation file according to the Hash algorithm, and it is determined whether the new verification value is the same as the verification value in the integrity protection file. If the new verification value is the same as the verification value in the integrity protection file, it is determined that the VNF software has not been tampered with; and the new verification value is different from the verification value in the integrity protection file, it is considered that the VNF software has been tampered with.

In this way, in this embodiment of the present invention, not only whether VNF software has been tampered with can be determined during installation, but also an installation file can be verified each time the software is started or restarted, to determine whether the VNF software has been tampered with, thereby greatly reducing a risk of using VNF software that has been tampered with.

Embodiment 3

Figure 7:
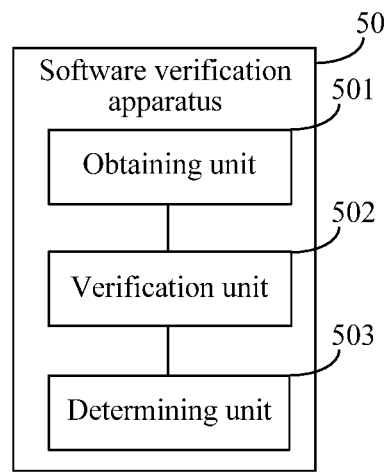
FIG. 7 is a schematic structural diagram of a software verification apparatus according to an embodiment of the present invention.

An embodiment of the present invention provides a software verification apparatus 50. The software verification apparatus 50 may include a VIM and a VNF. The VNF may include an obtaining unit 501, a verification unit 502, a determining unit 503, and a monitoring unit 504. The NVF may include an integrity protection unit 505 and a verification unit 502. As shown in FIG. 7, the apparatus may include:

the obtaining unit 501, configured to obtain installation files of VNF software and signature files of the installation files, where the signature files of the installation files are used to store verification information of the installation files;

the verification unit 502, configured to verify, according to the signature files of the installation files obtained by the obtaining unit 501, the installation files obtained by the obtaining unit 501; and the determining unit 503, configured to determine, when the verification of the installation files by the verification unit 502 succeeds, that the VNF software has not been tampered with.

In this way, by means of the apparatus provided in this embodiment of the present invention, whether an installation file has been tampered with can be automatically determined according to a verification file, thereby ensuring that the VNF software installed according to the installation file has not been tampered with.

The verification unit 502 is specifically configured to: perform, if it is determined that at least one installation file in the installation files is already modified according to a preset rule, integrity protection verification on the at least one installation file, and respectively verify corresponding installation files according to signature files of other installation files different from the at least one installation file.

Figure 8:
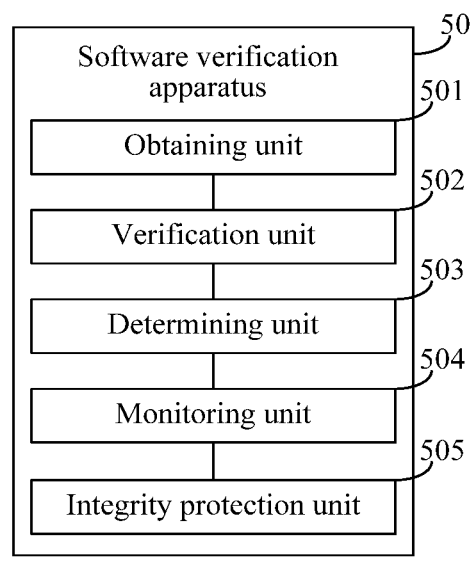
FIG. 8 is a schematic structural diagram of another software verification apparatus according to an embodiment of the present invention.

Further, as shown in FIG. 8, the apparatus 50 further includes:

a monitoring unit 504, configured to monitor whether the installation files are modified according to the preset rule; and an integrity protection unit 505, configured to perform, if at least one installation file is modified according to the preset rule, integrity protection on the at least one installation file.

Further, the obtaining unit 501 is specifically configured to:

obtain an installation package of the VNF software and a signature file of the installation package, where the installation package includes the installation files and the signature files of the installation files, and the signature file of the installation package is used to store verification information of the installation package;

verify the installation package according to the signature file of the installation package; and obtain the installation files and the signature files of the installation files if the verification of the installation package succeeds.

Embodiment 4

Figure 9:
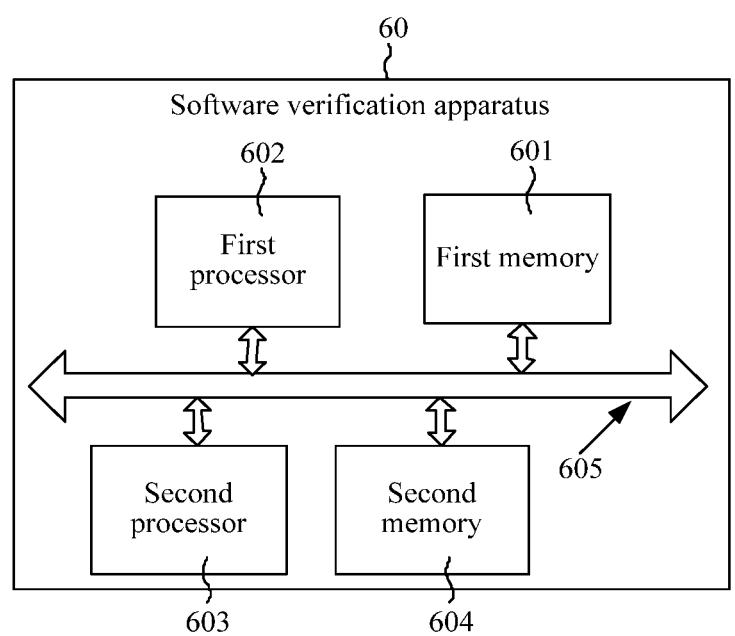
FIG. 9 is a schematic structural diagram of still another software verification apparatus according to an embodiment of the present invention.

FIG. 9 is a schematic structural diagram of a software verification apparatus 60 according to an embodiment of the present invention. The software verification apparatus 60 may be configured to execute the method shown in FIG. 2, FIG. 5, or FIG. 6A, FIG. 6B, and FIG. 6C, and may specifically include a first memory 601 and a first processor 602.

The first memory 601 may include a read-only memory and a random access memory, and is configured to store program code executed by the first processor 602.

The first processor 602 is configured to: obtain installation files of virtual network function VNF software and signature files of the installation files, where the signature files of the installation files are used to store verification information of the installation files; verify the installation files according to the signature files of the installation files; and determine, if the verification of the installation files succeeds, that the VNF software has not been tampered with.

In this way, by means of the apparatus provided in this embodiment of the present invention, whether an installation file has been tampered with can be automatically determined according to a verification file, thereby ensuring that VNF software installed according to the installation file has not been tampered with.

Further, the first processor 602 is specifically configured to:

verify the installation files according to the signature files of the installation files if it is determined that none of the installation files are modified according to a preset rule.

Further, the apparatus 60 further includes a second processor 603 and a second memory 604.

The second memory 604 may include a read-only memory and a random access memory, and is configured to store program code executed by the second processor 603.

The second processor 603 is configured to perform, if it is determined that at least one installation file in the installation files is already modified according to the preset rule, integrity protection verification on the at least one installation file.

The first processor 602 is further configured to respectively verify corresponding installation files according to signature files of other installation files different from the at least one installation file.

Further, the first processor 602 is further configured to: monitor whether the installation files are modified according to the preset rule, and notify the second processor 603 when at least one installation file is modified according to the preset rule.

The second processor 603 is further configured to perform, when at least one installation file is modified according to the preset rule, integrity protection on the at least one installation file.

Further, the first processor 602 is specifically configured to:

obtain an installation package of the VNF software and a signature file of the installation package, where the installation package includes the installation files and the signature files of the installation files, and the signature file of the installation package is used to store verification information of the installation package;

verify the installation package according to the signature file of the installation package; and obtain the installation files and the signature files of the installation files if the verification of the installation package succeeds.

It should be noted that, the first processor 602 may be configured to implement the function of the VIM in the embodiment shown in FIG. 5 or FIG. 6A, FIG. 6B, and FIG. 6C, and the second processor 603 may be configured to implement the function of the VNF.

It should be noted that, the first processor 602 and the second processor 603 in this embodiment may be a same processor, or may be different processors, and may be specifically located in a same computer or server, or may be respectively located in different computers or servers. The first memory 601 and the second memory 604 in this embodiment may be a same memory, or may be different memories, and may be specifically located in a same computer or server, or may be respectively located in different computers or servers.

It should be noted that, when the first processor and the second processor are different processors, the foregoing apparatus 60 further includes a communications bus 605. The communications bus 605 is configured to connect components in the apparatus 60, and may be specifically an Industry Standard Architecture (ISA) bus, a Peripheral Component Interconnect (PCI) bus, an Extended Industry Standard Architecture (EISA) bus, or the like. The bus 605 may be classified into an address bus, a data bus, a control bus, and the like.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A software verification method, comprising:

obtaining, via a cloud computing network, an installation package of virtual network function (VNF) software and a signature file of the installation package, the installation package comprising installation files of the VNF software and signature files of the installation files, wherein the signature file of the installation package is used to store verification information of the installation package, and wherein the signature files of the installation files are used to store verification information of the installation files;

verifying the installation package according to the signature file of the installation package; and in response to determining that the verification of the installation package succeeds:

obtaining the installation files and the signature files of the installation files;

verifying the installation files according to the signature files of the installation files, wherein verifying the installation files comprises:

verifying the installation files according to the signature files of the installation files when it is determined that none of the installation files are modified according to a preset rule; and performing, when it is determined that at least one installation file in the installation files is already modified according to the preset rule, integrity protection verification on the at least one installation file, and respectively verifying corresponding installation files according to signature files of other installation files different from the at least one installation file; and determining, when the verification of the installation files succeeds, that the VNF software has not been tampered with.

2. The method according to claim 1, wherein the method further comprises:

monitoring whether the installation files are modified according to the preset rule; and performing, when at least one installation file is modified according to the preset rule, integrity protection on the at least one installation file.

3. The method according to claim 1, wherein before the obtaining the installation package of the VNF software and the signature file of the installation package, the method further comprises:

signing the installation files to obtain the signature files of the installation files; and signing the installation package to obtain the signature file of the installation package.

4. A software verification apparatus, comprising:

at least one processor; and a non-transitory computer-readable storage medium coupled to the at least one processor and storing programming instructions for execution by the at least one processor, the programming instructions instruct the at least one processor to:

obtain, via a cloud computing network, an installation package of virtual network function (VNF) software and a signature file of the installation package, the installation package comprising installation files of the VNF software and signature files of the installation files, wherein the signature file of the installation package is used to store verification information of the installation package, and wherein the signature files of the installation files are used to store verification information of the installation files;

verify the installation package according to the signature file of the installation package; and in response to determining that the verification of the installation package succeeds:

obtain the installation files and the signature files of the installation files;

verify, according to the signature files of the installation files, the installation files, wherein verifying the installation files comprises:

verifying the installation files according to the signature files of the installation files when it is determined that none of the installation files are modified according to a preset rule; and performing, when it is determined that at least one installation file in the installation files is already modified according to the preset rule, integrity protection verification on the at least one installation file, and respectively verifying corresponding installation files according to signature files of other installation files different from the at least one installation file; and determine, when the verification of the installation files succeeds, that the VNF software has not been tampered with.

5. The apparatus according to claim 4, wherein the programming instructions instruct the at least one processor to:

monitor whether the installation files are modified according to the preset rule; and perform, when at least one installation file is modified according to the preset rule, integrity protection on the at least one installation file.

6. A software verification apparatus, comprising:

a first memory configured to store first program code;

a first processor configured to execute the first program code stored in the first memory to:

obtain, via a cloud computing network, an installation package of virtual network function (VNF) software and a signature file of the installation package, the installation package comprising installation files of the VNF software and signature files of the installation files, wherein the signature file of the installation package is used to store verification information of the installation package, and wherein the signature files of the installation files are used to store verification information of the installation files;

verify the installation package according to the signature file of the installation package; and in response to determining that the verification of the installation package succeeds:

obtain the installation files and the signature files of the installation files;

verify the installation files according to the signature files of the installation files when it is determined that none of the installation files are modified according to a preset rule; and determine, when the verification of the installation files succeeds, that the VNF software has not been tampered with;

a second memory configured to store second program code; and a second processor configured to execute the second program code stored in the second memory to perform, when it is determined at least one installation file in the installation files is already modified according to the preset rule, integrity protection verification on the at least one installation file, wherein the first processor is further configured to respectively verify corresponding installation files according to signature files of other installation files different from the at least one installation file.

7. The apparatus according to claim 6, wherein:

the first processor is further configured to monitor whether the installation files are modified according to the preset rule, and notify the second processor when at least one installation file is modified according to the preset rule; and the second processor is further configured to perform, when at least one installation file is modified according to the preset rule, integrity protection on the at least one installation file.

8. The apparatus according to claim 4, wherein the preset rule corresponds to whether content of at least one installation file is modified by a configuration module of the apparatus.

9. The apparatus according to claim 8, wherein when the configuration module modifies an internet protocol (IP) address in the at least one installation file from being empty to a current address, the at least one processor is configured to perform integrity protection on the at least one installation file.

* * * * *